United States Patent [19]

Otani et al.

[11] 4,443,337
[45] Apr. 17, 1984

[54] BIOLOGICAL TREATMENT OF WASTE WATER

[75] Inventors: Mitsunobu Otani; Teruo Senda; Michio Hirose, all of Otsu, Japan

[73] Assignee: Toray Industries, Inc., Tokyo, Japan

[21] Appl. No.: 352,203

[22] Filed: Feb. 25, 1982

Related U.S. Application Data

[63] Continuation of Ser. No. 114,410, Jan. 22, 1980, abandoned, and a continuation of Ser. No. 943,769, Sep. 20, 1978.

[30] Foreign Application Priority Data

Mar. 31, 1978 [JP] Japan .................................. 53-36719

[51] Int. Cl.$^3$ .............................................. C02F 3/05
[52] U.S. Cl. .................................... 210/602; 210/609; 210/615; 210/625
[58] Field of Search ................ 210/602, 609, 615–618, 210/625, 614

[56] References Cited

U.S. PATENT DOCUMENTS

| | | | |
|---|---|---|---|
| 2,142,196 | 1/1939 | Langdon | 210/615 |
| 2,457,057 | 12/1948 | Mallory | 210/625 X |
| 2,562,510 | 7/1951 | Schlenz | 210/615 X |
| 3,402,125 | 9/1968 | Tonaka | 210/615 |
| 3,444,076 | 5/1969 | Sekikawa et al. | 210/625 |
| 3,549,521 | 12/1970 | Stevens | 210/614 X |
| 3,557,954 | 1/1971 | Welch | 210/614 |
| 3,623,976 | 11/1971 | Cessna | 210/615 |
| 3,764,525 | 10/1973 | Goodman | 210/615 |
| 4,085,041 | 4/1978 | Fullerton et al. | 210/608 |

*Primary Examiner*—Thomas G. Wyse
*Attorney, Agent, or Firm*—Austin R. Miller

[57] ABSTRACT

A method for biologically purifiying waste water which produces substantially no excess waste sludge is provided. In this method, a waste water containing biodegradable substances is treated in a biological fixed film type reactor and aqueous water sludge discharged from the reactor is aerobically digested after being separated from the biologically treated waste water. The digested aqueous sludge is returned to the reactor or the upstream thereof. This method can be advantageously combined with any installed activated sludge type water purification process, to thereby substantially eliminate the production of excess waste sludge from the water purification system.

22 Claims, 7 Drawing Figures

BIOLOGICAL TREATMENT OF WASTE WATER

This is a continuation of application Ser. No. 114,410, filed Jan. 22, 1980, now abandoned, and a continuation of Ser. No. 943,769, filed Sept. 20, 1978.

The present invention relates to biological treatment of waste water, and more particularly relates to biological treatment of waste water in which no substantial amount of excess waste sludge is produced.

Recently, biological treatment techniques of waste water have been widely used for preventing water pollution resulting from the accumulation of organic substances which is indicated as B.O.D. (Biochemical Oxygen Demand). Known biological treatment methods of waste water typically include: (i) an activated sludge type process wherein waste water and flocks of microorganisms suspended therein are contacted with each other to purify the waste water, and; (ii) a biological fixed film type process wherein waste water is contacted with biological fixed films attached onto a support to purify the waste water.

Among these processes an activated sludge type process in which an aqueous suspension of microorganisms is utilized is most prevalent for purifying waste water such as sewage, various kinds of industrial waste water and the like. However, the known activated sludge type processes have the disadvantages that a large amount of excess waste sludge is produced and the cost of the treatment of the excess waste sludge thus produced is very high. The amount of the excess waste sludge produced in the activated sludge type processes is generally within the range of from 40 to 80% by weight, based on the amount of the B.O.D. components removed from the waste water. The typical method of treating excess waste sludge generally includes the steps of concentration, dewatering, drying and incineration. Particularly, since recent energy costs have been rapidly increasing, it has been very much desired to reduce the amount of excess waste sludge produced in the water treatment system. Although it has been practical to use either an aerobic or anaerobic method to digest excess waste sludge in order to reduce the solid contents of aqueous excess waste sludge, such digestion methods for treating excess waste sludge are unsatisfactory from the point of view of digestion efficiency and digestion rate, and the steps of treating the excess waste sludge become complicated and the operational control of the digestion treatment becomes difficult due to the post-treatment of the digested aqueous sludge and liquid. For instance, with respect to anaerobic digestion, even if the aqueous excess sludge is digested for a long period of time, such as from 20 to 40 days, the digestion efficiency of the process is at most 60%, and further, complicated steps are required, such as solid-liquid separation, washing of the digested sludge, flocculation of the washed sludge, dewatering, incineration and treatment of the separated liquid from the digested aqueous sludges. On the other hand, with respect to aerobic digestion, even if aqueous excess sludge is digested for a long period of time, such as from 5 to 20 days, the digestion efficiency of the process is at most 40–50%. In addition, the digested sludge is inferior in terms of concentration and dewatering properties, as compared to the original sludge, and the liquid removed from the digested sludge becomes turbid and white. Although a so-called total oxidation process which produces no substantial amount of excess sludge has already been proposed in the art, little of this process can be applied to practical use due to the fact that an extremely long period of aeration and a large space for installing the required apparatus are required.

The amount of excess waste sludge produced by the biological fixed film type process is generally within the range of from 30 to 50% by weight based on the amount of the B.O.D. components removed from the waste water, which amount is somewhat smaller than that of the activated sludge type process. However, this process also has problems in that a large amount of excess waste sludge is produced and the treatment of the excess waste sludge is troublesome and costly.

Accordingly, the objects of the present invention are to obviate the above-mentioned disadvantages and problems of the conventional biological treatment of waste water and to provide an improved biological treatment of waste water which produces no substantial amount of excess waste sludge.

Other objects and advantages of the present invention will be apparent from the following description.

In accordance with the present invention, there is provided a method for biologically purifying waste water comprising the steps of:

(a) contacting the waste water containing biodegradable substances with microorganisms in a biological fixed film type reactor under conditions sufficient to degrade said biodegradable substances;

(b) separating and concentrating an aqueous waste sludge contained in the biologically treated waste water discharged from the biological fixed film reactor by using a mechanical type separator or floatation equipment type separator;

(c) aerobically digesting the concentrated aqueous sludge, and;

(d) returning the digested aqueous sludge to the biological fixed film reactor or the upstream line thereof.

In accordance with the present invention, there is further provided a method for biologically purifying waste water containing biodegradable substances comprising the steps of:

(a) treating a portion of said waste water by using suspended microorganisms in water in an activated sludge type reactor under conditions sufficient to degrade said biodegradable substances (stage A);

(b) simultaneously and separately treating the remainder of said waste water by using a biological fixed film type reactor under conditions sufficient to degrade said biodegradable substances (stage B);

(c) aerobically digesting a mixture of (i) an aqueous excess waste sludge discharged from the activated sludge type reactor of step (a) and separated from the biologically treated waste water and (ii) an aqueous excess waste sludge discharged from the biological fixed film type reactor of step (b) and separated from the biologically treated waste water by using a mechanical type separator or floatation equipment type separator, (stage C) and;

(d) returning the digested aqueous sludge to the activated sludge type reactor of step (a), the biological fixed film type reactor of step (b) or both the reactors of steps (a) and (b) (stage D).

The present invention will be better understood from the following description with reference to the accompanying drawings, but is by no means limited to these drawings, in which.

The biological fixed film type reactors used in the present invention for purifying the waste water are known and are typically classified into the three groups, that is, (i) a trickling filter, (ii) a rotating disc contactor and (iii) an immersion type contact oxidation reactor. Any conventional biological fixed film reactor or contactor can be used in the present invention. Among the biological fixed film reactors, the inventors of the present invention recommend using the immersion type contact oxidation reactor in the present invention. The contact oxidation reactor is disclosed in detail in, for example, Japanese Patent Publication (KOKOKU) No. 45-22304/1970 and Japanese Patent Laid-Open Application (KOKAI) No. 51-15567/1976.

Figure 1:
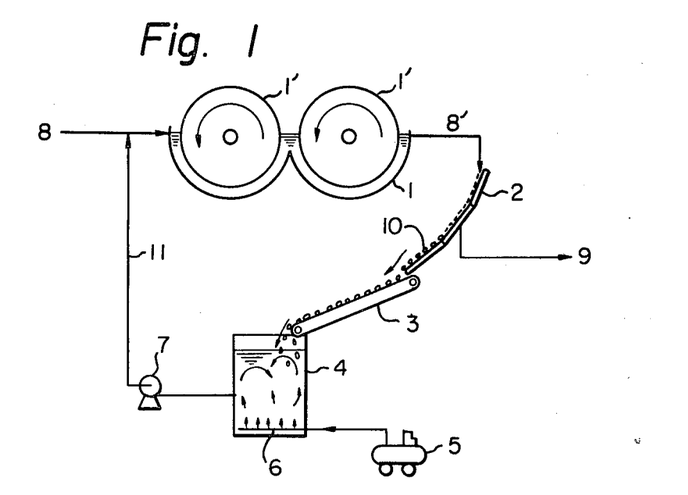
FIGS. 1 through 5 are schematic drawings illustrating the various embodiments of the method of the present invention in which waste water is biologically treated by using biological fixed film type reactors.

As shown in FIG. 1, waste water 8 containing biodegradable substances, is introduced into a rotating disc contactor 1 (i.e. a biological fixed film reactor). In the contactor 1, the waste water 8 is contacted with biological fixed films attached to the surface of the rotating disc 1', whereby the biodegradable substances (B.O.D. components) contained in the waste water 8 are biologically oxidized under conditions sufficient to degrade the biodegradable substances. Such conditions are well known in the art and, typically, include a BOD loading of 5 through 30 gr/m$^2$·day, a water residence time of 0.5 through 2 hrs and a rotation speed of 1-5 r.p.m.

The purified waste water 8' containing sludge is then transferred into a static inclined, screen 2 (i.e. a mechanical separator) where purified water 9 and an aqueous concentrated sludge 10 are separated from each other. The purified water 9 is flowed out of the waste water treatment system, whereas the aqueous concentrated sludge 10 is continuously fed to a digesting vessel 4 by means of a belt conveyor 3. In the digesting vessel 4, the sludge 10 is aerobically digested by aeration with air (oxygen) fed through an air supplying device 6 from an air supply compressor 5. The digested liquid 11 is returned to the feed line of the waste water 8 into the rotary disc contactor 1 by means of a pump 7. Thus, the closed waste water purification system is completed without producing substantially any excess waste sludge.

Figure 2:
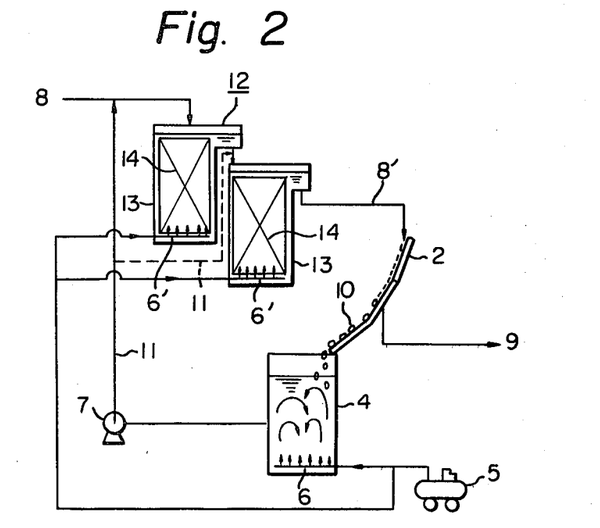

In the process shown in FIG. 2, two biological fixed film reactors 12, each comprising a vessel 13, a plurality of parallel spaced and substantially vertically disposed porous supports 14, such as plastic nets, in the vessel 13 and an air supplying device 6' disposed under the supports 14 are used in lieu of the rotary disc contactor 1 of FIG. 1. That is, as shown in FIG. 2, waste water 8 containing biodegradable substances is, in series, introduced into two biological fixed film reactors 12. In the reactors 12, the waste water 8 is contacted with biological fixed film attached onto the surfaces of the supports 14, whereby the biodegradable substances contained in the waste water are biologically oxidized with aeration. The purified waste water 8' containing sludge is then transferred into a static inclined screen 2 where aqueous concentrated sludge 10 is separated from purified water 9. The aqueous concentrated sludge 10 falls down into a digesting vessel 4, where the sludge is aerobically digested by aeration with air fed through an air supplying device 6 from an air supplying compressor 5. The digested liquid 11 is returned to either or both of two reactors 12 by means of a pump.

Although a single biological fixed film reactor 12 can be used in the practice of this invention, the use of the two biological fixed film reactors is advantageous for the following reason. That is, in the first reactor, B.O.D. components contained in the waste water 8 and the digested liquid 11 are mainly degraded, whereas, in the second reactor, fine sludge is converted into coarse sludge and large organisms, such as metazoa, are grown under mild aeration conditions.

Figure 3:
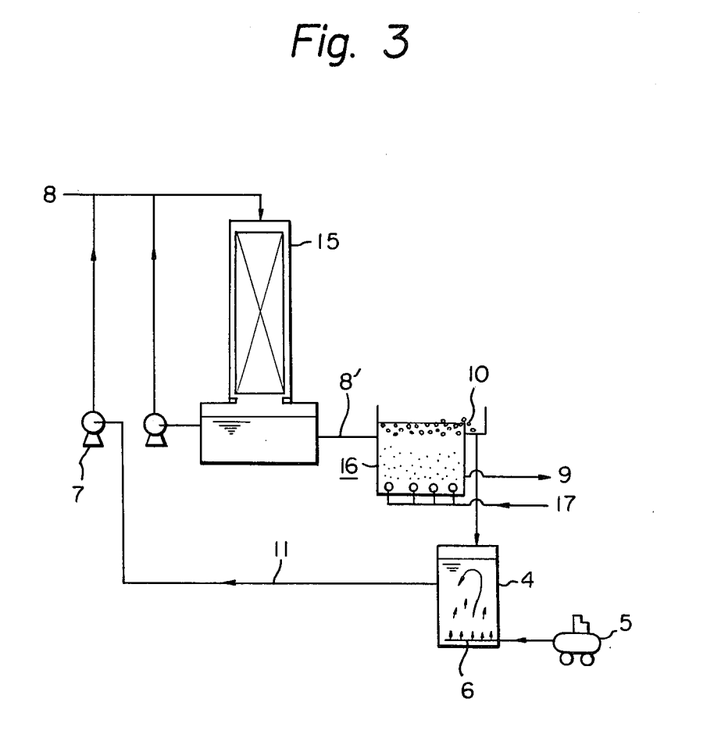

In the process shown in FIG. 3, waste water 8 containing biodegradable substances is introduced into a trickling filter 15, wherein the biodegradable substances contained in the waste water 8 are biologically oxidized. The purified water 8' containing sludge is then transferred into a floatation vessel 16. In the floatation vessel 16, the sludge contained in the purified water 8 is floated by the action of air 17. Aqueous sludge 10 thus separated and concentrated is fed to a digesting vessel, and is aerobically digested by aeration with air introduced through an air supplying device 6 from an air supplying compressor 5. The digested liquid is returned to the waste water feed line of the trickling filter 15 by means of a pump 7.

Figure 4:
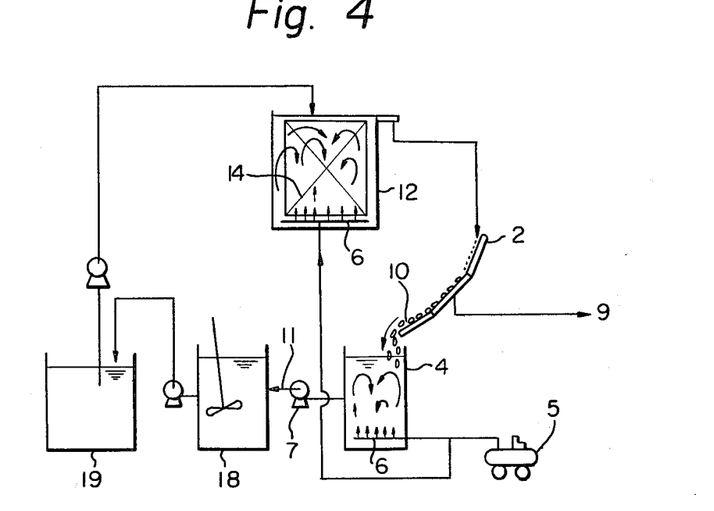

In the process shown in FIG. 4, the aerobically digested liquid is anaerobically digested in a digesting vessel 18. That is to say, waste water 8 discharged from a waste water reservoir 19 is biologically treated in a biological fixed film reactor 12, as described above with reference to FIG. 2, and the purified water is aerobically digested in a digesting vessel 4 after being separated and concentrated in a static inclined screen 2. The aerobically digested liquid 11 is then introduced into another digesting vessel 18 wherein the liquid 11 is anaerobically digested. The digested liquid from the vessel 18 is returned to the waste water reservoir 19 and, in turn, introduced into the biological fixed film reactor 12.

This process is especially advantageous and effective in the case where sludge, which is difficult to digest by only aerobic digestion, is treated.

Figure 5:
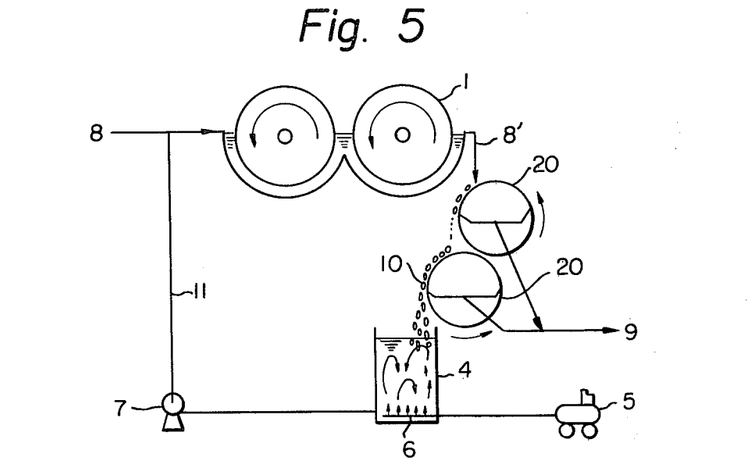

In the process shown in FIG. 5, the static inclined screen 2 of the process shown in FIG. 1 is only replaced with rotating drum screens 20, where sludge contained in the treated waste water 8' is separated from the purified water 9 in the form of concentrated aqueous sludge 10.

As mentioned above, the biological fixed film reactor used in the practice of the present invention can be any conventional type of biological fixed film reactor, such as, for example, a trickling filter, a rotating disc contactor, an immersion type contact oxidation reactor or the like.

Sludge discharged from the biological fixed film reactor is mainly separated by supports onto which the biological fixed films are attached, and, therefore, the sizes of clumps of the sludge are very large. Further, this sludge easily slides down surfaces of separation elements. This is because, since the sludge involves much water and is therefore so bulky, the sludge has little friction against said surfaces of the separation elements. Accordingly mechanical type separators, such as a static inclined screen, can be advantageously used for rapidly separating an aqueous sludge from the purified water.

The second advantage of the use of the biological fixed film reactors resides in the fact that various organisms participate in the biological degradation reaction in the biological fixed film reactor. That is, in the biological fixed film system, since the organisms, which participate in the biological degradation reaction, are attached to supports, an anaerobical state is generated at the surfaces of the supports due to the lack of oxygen; whereas an aerobical state is maintained at the surfaces of the attached biological fixed films which are in contact with the waste water, due to the fact that sufficient oxygen is supplied. Thus, since both aerobical and anaerobical states can be simultaneously maintained in the same reactor in the biological fixed film system (this is not the case where a system using suspended microorganisms, such as an activated sludge treatment, is used), many kinds of organisms are present in the reactor. The large number of kinds of organisms also relates to a low yield of sludge production in the method of the present invention.

The biological phases of the biological fixed films are generally classified into the following three groups. The first group includes microorganisms mainly containing bacteria, such as zoogloea, which are attached onto the surfaces of the supports in the reactor in a thickness of 2 through 10 mm. The second group includes protozoa, such as, for example, ciliatea, flagellata, rhizopoda and the like, which are attached to or covered over the microorganisms of the first group. The third group includes large organisms (which are called organisms which use sludge as food), such as, for example, nematoda, rotatoria, oligochaeta, arthropoda and the like. These organisms form microbial food chains, that is, the organisms of the first group are used, as food, by those of the second group, which in turn are used, as food, by those of the third group. Thus, these various kinds of organisms are simultaneously present in an equilibrium state in the internal environmental conditions of the biological fixed film reactor. These phenomena show that sludge digestion is a kind of successive reaction, and, therefore, the production amount of excess waste sludge in a conventional biological fixed film process is somewhat smaller than that of the activated sludge aeration process.

We have found that the organisms of the second and third groups have a large sludge digesting capacity and that a suprisingly high digesting speed (which is far larger than that of conventional digestion) and an approximately 100% digesting efficiency can be obtained by introducing the organisms of the second and third groups into an aerobical digester after being separated and concentrated. The output line and the dead bodies of the organisms of the second and third groups in the aerobical digester, which are nutrient sources of the microorganisms of the first group, are returned to the biological fixed film reactor. Thus, microbial food chains are formed in the present waste water treatment system.

We have also found that the line large organisms are vulnerable to the lack of oxygen and that, when they are maintained for a few or several hours in the state of lack of oxygen, they die and lose their activity. Accordingly, when the large organisms are separated from the purified water, it is necessary that they be rapidly separated to keep them alive and fed into an aerobical digester or that they be separated under the conditions where enough oxygen is present. For this reason, sludge thickeners which are usually used for separating excess sludge from the purified water in the conventional waste water treatment process cannot be used in the present invention.

The separation and concentration devices which can be used for separating and concentrating sludge in the practice of the present invention include a mechanical type separator and floatation equipment. The mechanical type separators used in the present invention include, for example:

a static inclined screen, such as a wedge wire screen composed, as a separating element, of a plurality of parallel spaced rows of wedge wires, each having a V-cross sectional shape;

a drum screen, such as a micro strainer;

a vibrating sieve;

a centrifugal separator;

a filtering machine and the like.

Although the separation rate of the sludge separator depends upon the sludge concentration of the purified water discharged from the biological fixed film reactor, the amount of water to be treated based on the unit area of the separating element and the unit time is, preferably, within the range of from 10 to 10,000 $m^3/m^2$/day, and, more preferably, within the range of from 100 to 5,000 $m^3/m^2$/day. The concentration of the sludge after the separation and concentration is generally 5,000 mg/l or more, and preferably 20,000 mg/l or more. The preferred separation time is 60 minutes or less.

The concentrated sludge can be transferred to the aerobical digester by means of conventional transportation means, such as a belt conveyor, or directly from the separator to the digester by the action of gravity. However, it is not advisable to use a transportation means such as a pump, which imparts a shearing force to the sludge, because the large organisms present are killd by the action of the shearing force. The transportation of sludge can be continuously or semi-continuously carried out. The period of time for which the sludge is transferred into the digestor after the separation and concentration is preferably within 4 hours, and more preferably, within one hour.

The digester (or digesting vessel) used in the practice of the present invention is mainly an aerobical type digester, but the addition of an anaerobical type digester and the like, which are generally utilized in the conventional sludge treatment cycle, can be also applied in the present process. When the sludge concentration in the digester is high, a good efficiency can be obtained. For this reason the sludge concentration is preferably 5,000 mg/l or more, and more preferably, 10,000 mg/l or more. The advantage of the present invention is that the concentration of the aqueous concentrated sludge can be raised by using the mechanical separator mentioned above. Therefore, the volume of the digester can be minimized. The residence time of the aqueous concentrated sludge is generally within the range of from 5 to 60 days, and more preferably within the range of from 10 to 30 days. The other digesting conditions are similar to those which are well known in the art. For example, a temperature of 10° through 40° C., an aeration rate per vessel volume of 0.3 through 3 $Nm^3/m^3$·hr and a pH of 3.5 through 8.5 are typically used.

The digested liquid according to the present invention can be returned to any place which is a waste water feed portion of the biological fixed film reactor or upstream thereof, such as, for example, a feed line of the waste water, a raw waste water tank, a feed line of the raw waste water tank and the like.

The digestion process of the present invention is different from the conventional digestion processes in the following points.

(1) The sludge solubilized or finely divided in the digester is returned to the biological fixed film reactor, wherein most parts of the sludge are adsorbed onto or absorbed into the surfaces of the biological fixed films, together with organic substances contained in the waste water. Thus, the sludge is taken into the bodies of the organisms and converted to fresh biological fixed films. This feature can be called a biological coagulation phenomenon, in which the solubilized or finely divided sludge in the digester is assimilated in the biological fixed film reactor.

(2) Along with the sludge recycled to the biological fixed film reacter, the sludge which is not completely digested in the digester is again recycled into the digester through the reactor and separator. Accordingly, sludge which is not easily digested can be repeatedly digested in the digester and, then, finally, completely digested. This feature can be called a multi-cycle digestion.

(3) As mentioned above, sludge produced in the biological fixed film reactor is partially digested by microbial food chains held in the biological fixed films. Since the digestion in the biological fixed film reactor is caused by organisms which are different from those in the digester, sludge which is not digested in the digester can be sufficiently digested in the biological fixed film reactor. This feature can be called a multi-stage digestion.

In conventional sludge digestion processes, solubilized sludge in the excess sludge is separated from unsolubilized sludge by washing and is returned to raw waste or treated in another step. The unsolubilized sludge is finally incinerated even if it contains a substantial amount of biodegradable components. That is, the conventional process is a one-cycle and one-stage digestion system, whereas the present invention is multi-cycle and multi-stage digestion system.

Another feature of the present invention resides in the fact that poisonous substances can be washed-off or degraded in the recycling system of the present invention. That is, the poisonous substances which inhibit the biological sludge digestion reaction are washed-off or are degraded by bacteria in the course of the recycling system of the present invention and, therefore, the accumulation of the poisonous substances in the digester which causes a decrease in the aerobical digestion reaction can be effectively avoided. This is one of the reasons that a high digesting efficiency is obtained in the present invention.

As will be clear from the above description, according to the present invention, microbiological food chains are completely formed in the recycling system of the present invention and the growing environment of organisms which is necessary for achieving the microbial food chains is maintained in best conditions. The degradation energy which organisms have is insufficiently utilized in conventional sludge digestion, whereas the degradation energy is exhaustively utilized in the present invention. Thus, a biological waste water treatment which produces no substantial amount of excess waste sludge can be unexpectedly achieved according to the present invention.

In accordance with another aspect of the present invention, waste water is simultaneously treated in the activated sludge type reactor and the biological fixed film type reactor, and a mixture of aqueous concentrated sludge discharged from both reactors is aerobically digested. The digested liquid can be returned to the activated sludge type reactor and/or the biological fixed film type reactor. Thus, no substantial amount of excess waste sludge is produced from the waste water treatment system. This aspect of the present invention has the outstanding advantage that the production of excess waste sludge in an already installed activated sludge type reactor can be substantially eliminated only by combining a relatively small size biological fixed film type reactor and a sludge digesting vessel with any already installed activated sludge type waste water purification plant. This drastically reduces the costs and the work required in the conventional activated sludge system.

Figure 6:
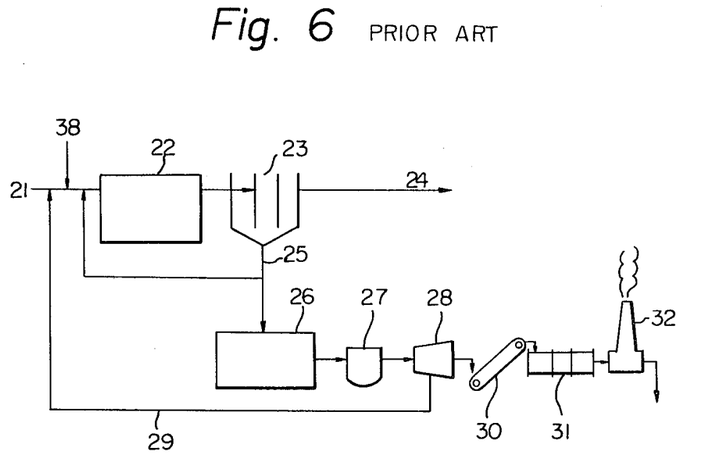
FIG. 6 is a schematic drawing illustrating a conventional method for purifying waste water by using an activated sludge type reactor.

As shown in FIG. 6, in a conventional activated sludge type waste purification system, waste water 21 containing biodegradable substances is introduced into an activated sludge aeration vessel 22, wherein the biodegradable substances are oxidized with aeration. Into the waste water phosphoric acid 38 is added for maintaining the multiplication of organic fungus bodies. The treated water is then transferred into a sludge thickener 23. In the thickener 23, aqueous sludge 23 is separated from the purified water 24, which is flown out of the system. A portion of the aqueous concentrated sludge 25 is returned to the sludge aerator 22 as additional activated sludge. The remainder of the aqueous concentrated sludge (i.e. the excess waste sludge) is fed to a sludge storage tank 26. The excess waste sludge is coagulated in a coagulation vessel 27 by the addition of a coagulating agent and is dewatered in a centrifugal separator 28. The centrifuged filtrate 29 is returned to the feed line of the waste water 21. The dehydrated excess sludge is introduced into a dryer 31 via a conveyor 30 and, thereafter is incinerated in an incinerator 32.

Figure 7:
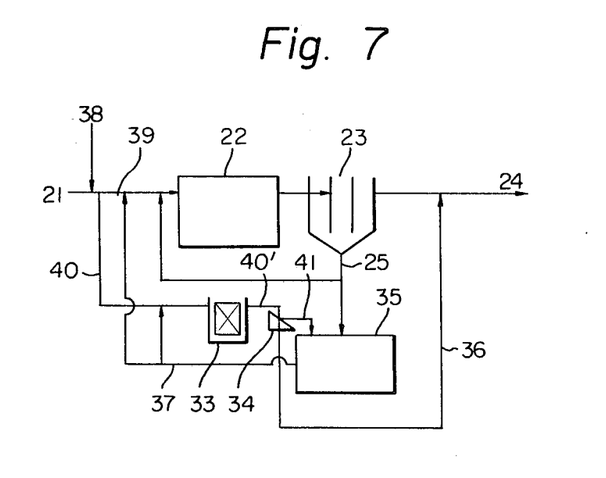
FIG. 7 is a schematic drawing illustrating a preferred embodiment of the method of the present invention in which waste water is biologically treated by using, in parallel, an activated sludge type reactor and a biological film type reactor.

Contrary to the above, in accordance with the present invention, as shown in FIG. 7, the excess sludge treatment steps after the coagulation vessel are eliminated and a biological fixed film reactor 33, in which a portion of the waste water 21 is treated, and a digesting vessel 35 are added. That is, a portion 39 of the waste water 21 is biologically treated in the activated sludge aeration vessel 22 as in the process shown in FIG. 6. The remainder 40 of the waste water 21 is introduced in a biological fixed film reactor 33 and the waste water 40 is contacted with biological fixed films in the reactor 33. Thus, biodegradable substances contained in the waste water 40 are biologically oxidized in accordance with any conventional technique. The purified waste water 40' containing biological sludge is then fed into a mechanical type separator 34 (or floatation equipment). The purified water 36 is flowed out of the system and an aqueous concentrated sludge 41 is continuously fed to a digesting vessel 35, together with the aqueous excess sludge 25 from the thickener 23. A portion of the aqueous excess sludge 25 is returned to the sludge aerator 22 as additional activated sludge. In the digesting vessel 35, the mixture of the aqueous sludge 25 and 41 is aerobically digested by aeration with air fed through an appropriate air supplying means (not shown in FIG. 7). The sludge storage tank 26 of the installed plant shown in FIG. 6 can be easily modified to the digesting vessel 35 in the case where an already installed plant as shown in FIG. 6 is reconstructed into the plant as shown in FIG. 7. The digested liquid 37 is returned to either or both of the sludge aerator 22 and the biological fixed film reactor 33. Although the same waste water is separately treated in the activated sludge reactor and the biological fixed film reactor in the embodiment shown in FIG. 7 it will be noted that different waste waters can be separately treated in both reactors.

In stage A of this aspect of the present invention, waste water containing biodegradable substances is contacted with flocks of suspended microorganisms in a known manner, whereby the biodegradable substances are oxidized.

In the stage B, waste water containing biodegradable substances is contacted with the biological fixed films in the biological fixed film reactor, as mentioned in the first aspect of the present invention. The stage A operation and the stage B operation are simultaneously and separately carried out in parallel.

In stage C, aqueous concentrated sludge discharged from stage A and stage B is continuously or intermittently mixed together and the mixture is aerobically digested by stirring in a known manner. Although the mixing ratio of the sludge discharged from the stage A and the stage B can be varied within a wide range depending upon the digesting conditions, the mixing ratio of the excess sludge discharged from stage A to that discharged from stage B is generally within the range of from 98:2 to 50:50, and more preferably 95:5 to 70:30, in terms of the dry weight of the excess sludge. When the mixing ratio is below 98:2, improvement of digestion efficiency is not clearly recognized. A mixing ratio above 50:50 can be utilized. However, since no useful purpose would be served thereby, it is not preferable from an economical point of view.

The control of the mixing ratio of the sludge discharged from stages A and B can be easily achieved by adjusting the feed ratio of waste water to the stages A and B. The feed amount of the waste water to stage B (i.e. the biological fixed film reactor) is generally within the range of from 1 to 50% by weight and, more preferably, within the range of from 3 to 30% by weight, based on the total amount of the waste water. This means that the installation volume capacity of stage B is remarkably smaller than that of stage A. The digesting period is generally within the range of from 3 to 30 days and, preferably, 5 to 24 days. The digested liquid in the digester can be returned to either or both of stages A and B.

As mentioned hereinabove, the sludge discharged from stage B (i.e. discharged from the biological fixed film reactor via a mechanical type screen or floatation equipment) mainly contains three types of organisms, that is: bacteria such as zoogloea; protozoa, and; large organisms, such as arthropoda. However, the sludge discharged from stage A (i.e. discharged from the activated sludge aeration reactor via a sludge thickner) mainly contains only bacteria such as zoogloea. Since the sludge discharged from the activated sludge aeration reactor mainly contains bacteria and few large organisms, it often causes a bulking phenomenon (a phenomenon in which normal operations can not be performed due to the fact that the settling property of the sludge is very poor) in the digester and it is not easily digested. In addition, a large amount of the sludge is produced. On the other hand, since the sludge discharged from the biological fixed film reactor contains a large amount of large organisms, the settling property of the sludge is good and the sludge is easily digested. In addition, the production amount of the sludge is small.

According to the second aspect of the present invention, since the sludge discharged from stage A is mixed with the sludge discharged from stage B, the mixed sludge can be rapidly and effectively digested under an aerobical condition by the presence of the large organisms derived from the sludge of stage B. Thus, food chains are formed in the organisms derived from stages A and B and no substantial amount of excess sludge is produced. The digested liquid is then returned to the activated sludge aeration reactor and/or the biological fixed film reactor, where the oxidation reaction by small organisms, mainly bacteria, takes place to thereby degrade the digested sludge as well as the biodegradable substances contained in the waste water. This circulation washes off poisonous substances which are accumulated in the digester and which inhibit the digesting reaction in the digester. In the case where the digested liquid which contains a relatively large amount of large microorganisms is returned to the activated sludge aeration reactor, the digesting reaction occurs in the activated sludge aeration reactor in the presence of the large organisms and the settling property of the sludge is improved. In the case where the digested liquid is returned to the biological fixed film reactor, the biological phases of the reactor become stable and the kinds of large organisms contained in the sludge discharged from the reactor become substantially constant.

As will be clear from the above description, according to the present invention, a large amount of excess sludge derived from an already installed activated sludge type waste water treatment plant can be substantially eliminated.

The present invention will be further illustrated by, but is by no means limited to, the following examples.

EXAMPLE 1

Domestic waste water having a B.O.D. content of 250 mg/l was treated according to the process as shown in FIG. 1. That is, 50 l/hr of the domestic waste water was continuously introduced into a rotating disc contactor having a volume of 100 liters. The biologically treated waste water was then transferred to a wedge wire screen, Static Sieve Screen (manufactured from ANDO SCREEN MANUFACTURING CO., LTD.) having a separation element area of 0.05 m$^2$ and a slit width of 0.5 mm. Concentrated aqueous sludge having a sludge concentration of 40,000 mg/l was separated from the purified water. The aqueous concentrated sludge was aerobically digested in a complete mixing type aerobical digesting vessel having a volume of 80 liters. The concentration of the sludge in the digesting vessel was 18,000 mg/l. The digested liquid was returned to the waste water feed line of the rotating disc contactor. In this example, since the concentration efficiency (or separation efficiency) was very high, the amount of the returning digested liquid, which was substantially equal to that of the aqueous concentrated sludge, was approximatel 0.8%, based upon the amount of the waste water fed to the rotating disc contactor.

The results are shown in Table 1 below, together with the results of Comparative Example 1 where the waste water was treated by using only the rotating disc contactor used in the above example.

TABLE 1

| | Waste Water | Treated Water | | Residence Time | |
|---|---|---|---|---|---|
| | B.O.D. (mg/l) | B.O.D. (mg/l) | SS* (mg/l) | Contactor | Digestor |
| Example 1 | 250 | 10 | <10 | $2^{HR}$ | $30^{DAY}$ |
| Comparative Example 1 | 250 | 20 | 110 | $2^{HR}$ | — |

*Suspended Solid

As will be clear from Table 1, according to the present invention, not only no substantial amount of excess waste sludge is produced, but also B.O.D. removal efficiency is superior to that of the biological fixed film type process.

EXAMPLE 2

45 l/hr of domestic waste water having a B.O.D. content of 315 mg/l was continuously treated according to the process as shown in FIG. 2. Two biological fixed film reactors, each having a volume of 90 liters and provided with porous supports for biological fixed films composed of plurality of plastic nets were used.

The results are shown in Table 2, together with the results of Comparative Example 2 wherein the municipal waste water was treated by using only two biological fixed film reactors used in Example 2.

TABLE 2

| | Waste Water | | Effluent from First Reactor | | Purified Water | |
|---|---|---|---|---|---|---|
| | B.O.D. (mg/l) | | B.O.D. (mg/l) | SS (mg/l) | B.O.D. (mg/l) | SS (mg/l) |
| Example 2 | 315 | | 142 | 98 | 21 | <8 |
| Comparative Example 2 | 315 | | 173 | 182 | 38 | 76 |

As will be clear from Table 2, no substantial amount of excess waste sludge contained in the purified water is produced in Example 2. Compared to Comparative Example 2.

EXAMPLE 3

100 l/hr of industrial waste water having a CODcr (Chemical Oxygen Demand according to a chromium method) content of 200 mg/l and an oil content of 25 mg/l was treated according to the process shown in FIG. 3. A trickling filter having a volume of 250 l and a water load of 10 through 30 m³/m².day and a floatation vessel having a volume of 100 l and using a pressurized water (3.5 kg/cm²) of 100 l/hr were used, as the biological fixed film reactor and the sludge separation device, respectively.

The results are shown in Table 3, together with the results of Comparative Example 3 wherein the municipal waste water was treated by using only the trickling filter of Example 3.

TABLE 3

| | Waste Water | | Purified | | |
|---|---|---|---|---|---|
| | B.O.D. (mg/l) | Oil Content (mg/l) | B.O.D. (mg/l) | Oil Content (mg/l) | SS (mg/l) |
| Example 3 | 180 | 25 | 21 | 6 | 12 |
| Comparative Example 3 | 180 | 25 | 23 | 9 | 91 |

With respect to the waste water containing oils, floatation equipment can be advantageously used due to the fact that the excess sludge is light compared to that produced from waste water containing no oil. In addition, in the case where the trickling filter is used as a biological fixed film reactor, floatation equipment is advantageously used compared to the mechanical type separation device, since the size of the excess waste sludge is smaller than that of the immersion type biological fixed film reactor.

EXAMPLE 4

84 m³/hr of industrial waste water having a B.O.D. content of 200 through 300 ppm and a SS content of 20 through 30 ppm was continuously treated according to the process shown in FIG. 7. An activated sludge type aeration vessel having a volume of 540 m³ and a biological fixed film reactor comprising a 40 m³ vessel having supports for biological fixed films were used, said supports being composed of plastic nets. 90% of the waste water was treated in the activated sludge type aerator (a stage A) and the remainder was treated in the biological fixed film reactor (a stage B).

The treated water discharged from the activated sludge type aeration vessel (i.e. stage A) was introduced into a sludge thickner having a volume of 670 m³ and the purified water separated from the concentrated sludge was flown out of the system. A portion of the aqueous concentrated sludge was returned to the sludge aerator and the remainder of the aqueous concentrated sludge was fed into a digesting vessel having a volume of 180 m³.

On the other hand, the treated water discharged from the biological fixed film reactor (i.e. stage B) was fed to a static inclined screen (a wedge wire screen, STATIC SIEVE SCREEN, manufactured by ANDO SCREEN MANUFACTURING CO., LTD.) having a separation element area of 0.48 m² and a slit width of 0.25 mm. The sludge separation time in the screen was about 3 minutes and the concentration of the aqueous concentrated sludge separated from the purified water in the screen was 2 through 4% by weight.

The mixture of the aqueous concentrated sludges from the sludge thickner of the stage A (flow rate 0.6 m³/hr, sludge content 0.8%) and the aqueous concentrated sludge from the separation screen of the stage B (flow rate 13 l/hr, sludge content 2 through 4%) was digested in the digesting vessel under the following conditions.

| Digesting Temperature | 26° C. |
|---|---|
| Residence Time | 13 days |
| Dissolved Oxygen in Water | 3–4 ppm |
| pH | 4.5–6.0 |
| Aeration rate per vessel volume | 1.0 Nm³/m³ · hr |

The digested water was returned to the sludge aerator. The results are shown in Table 4 below.

As a comparative Example 4, 84 m³/hr of industrial waste water having a B.O.D. content of 200 through 300 ppm and a SS content of 20 through 30 ppm was continuously treated according to the process shown in FIG. 6. The volume of the activated sludge aerator was 540 m³ and the volume of the sludge thickner was 670 m³. The results are also shown in Table 4.

TABLE 4

| | Purified Water | | | |
| --- | --- | --- | --- | --- |
| | B.O.D. (ppm) | SS (ppm) | Excess Sludge* (dry) | SVI** |
| Example 4 | 20 | 20 | 80 kg/day | 400 |
| Comparative Example 4 | 15 | 18 | 0 | 80 |

*Average Amount in 6 Months Operation
**Sludge Volume Index (Settling Property of Sludge Produced in Stage A)

As will be clear from the above Table 4, the purity of the water treated in the process shown in FIG. 7 (Example 4) is superior to that of the process shown in FIG. 6 (Comparative Example 4) and, surprisingly, no substantial amount of excess sludge was taken out of the system in Example 4. In addition, an addition amount of the phosphoric acid in Example 4 was about 10 through 20% by weight of that in Comparative Example 4. This fact also shows that the sludge digestion efficiency in Example 4 was nearly 100%. Thus, according to the present invention (Example 4), since substantially no excess sludge was produced in the water treatment system, the coagulation agent, heavy oil (fuel) and phosphoric acid, which are necessary in a large amount in the process shown in FIG. 6, were completely or substantially removed, and the other treatment cost and the required number of workers were significantly reduced.

What we claim is:

1. A method for biologically purifying waste water containing biodegradable substances comprising the steps of:
   a. contacting the waste water with microorganisms in a biological fixed film type reactor under conditions sufficient to degrade the biodegradable substances and to produce a sludge which contains a mixture of bacteria, protozoa, and large organisms;
   b. separating and concentrating the sludge from the biologically treated waste water discharged from the reactor of step (a) in the presence of sufficient oxygen to maintain life in the protozoa and large organisms of the sludge by using a static inclined screen separator;
   c. aerobically digesting the sludge discharged from the separator of step (b) in the presence of sufficient oxygen to maintain life in the protozoa and large organisms of the sludge by using a digester; and
   d. returning substantially all of the digested sludge containing live protozoa and live organisms to the reactor of step (a) or to a line upstream thereof, whereby substantially all of the sludge is recycled.

2. The method defined in claim 1, wherein the digestion step is performed for a period of 5 to 60 days.

3. The method defined in claim 2, wherein the period is 10 to 30 days.

4. A method for biologically purifying waste water containing biodegradable substances comprising the steps of:
   a. dividing a stream of the waste water into two portions;
   b. contacting a portion of the waste water with suspended microorganisms in water in an activated sludge type reactor under conditions sufficient to degrade the biodegradable substances to produce a sludge;
   c. simultaneously and separately treating another portion of the waste water by contact with microorganisms in a biological fixed film type reactor under conditions sufficient to degrade the biodegradable substances and to produce a sludge which contains a mixture of bacteria, protozoa, and large organisms;
   d. separating and concentrating the sludge from the biologically treated waste water discharged from the reactor of step (c) in the presence of sufficient oxygen to maintain life in the protozoa and large organisms of the sludge by using a static inclined screen separator;
   e. aerobically digesting a mixture of sludges discharged from the reactor of step (b) and the separator of step (d) in the presence of sufficient oxygen to maintain life in the protozoa and large organisms of the sludge by using a digester; and
   f. returning substantially all of the digested sludge containing live protozoa and live organisms to the reactor of step (b), to the reactor of step (c) or to a line upstream thereof, whereby substantially all of the sludge is recycled.

5. The method defined in claim 4, wherein the digestion step is performed for a period of 3 to 30 days.

6. The method defined in claim 5, wherein the period is 5 to 20 days.

7. The method defined in claim 4, wherein a mixing ratio of the sludge discharged from step (b) to that discharged from step (d) is within the range of from 98:2 to 50:50 in terms of the dry weight of the sludge.

8. The method defined in claim 7, wherein the mixing ratio is 95:5 to 70:30.

9. A method for biologically purifying waste water as defined in claim 1 or 4, wherein said inclined screen separator has a wedge wire screen composed of a plurality of parallel spaced rows of wedge wires each having a V cross sectional shape.

10. The method defined in claim 1 or 4, wherein said biological film type reactor comprises a vessel having an inlet for influent and an outlet for effluent and is provided with a support within the vessel onto which microorganisms are attached.

11. The method defined in claim 1 or 4, wherein said biological film type reactor comprises:
   i. a vessel having an inlet and an outlet for the waste water and having means for holding the waste water;
   ii. a support comprising a plurality of perforated plates or sheets or net-like materials substantially vertically mounted within the vessel substantially parallel and spaced from each other, and
   iii. an aeration device mounted under the support for continuously and uniformly supplying air to the waste water present in the vessel.

12. The method defined in claim 1 or 4, wherein said concentrated sludge is transported to said aerobic digestion step on a belt conveyor.

13. The method defined in claim 1 or 4, wherein said concentrated sludge is transported to said aerobic digestion step by gravity.

14. The method defined in claim 1 or 4, wherein said concentrated sludge is transported continuously to said aerobic digestion step.

15. The method defined in claim 1 or 4, wherein said concentrated sludge is transported semi-continuously to said aerobic digestion step.

16. The method defined in claim 1 or 4, wherein said concentrated sludge is transported to said aerobic digestion step within a period of four hours.

17. The method defined in claim 1 or 4, wherein said concentrated sludge is transported to said aerobic digestion step within one hour.

18. The method defined in claim 1 or 4, wherein aerobically digested sludge is returned to the biological film reactor from the aerobic digester and is absorbed onto or into the surfaces of biological fixed films and converted therein to fresh biological films, with digestion by microbiological food chains.

19. The method defined in claim 1 or 4, wherein poisonous substances accumulated in the aerobic digestion step, which substances would inhibit the digestion reaction, are washed off or degraded by bacteria in the course of the recycling step.

20. The method defined in claim 1 or 4, wherein microbiological food chains are formed in the recycling system.

21. The method defined in claim 1 or 4, wherein the amount of water treated, per unit of area of the separating element utilized in step (b), is about $10-10,000 m^3/m^2/day$.

22. The method defined in claim 21, wherein said amount is about $100-500 m^3/m^2/day$.

* * * * *

UNITED STATES PATENT AND TRADEMARK OFFICE
CERTIFICATE OF CORRECTION

PATENT NO. : 4,443,337
DATED : 4/17/84
INVENTOR(S) : Mitsunobu Otani; Teruo Senda; Michio Hirose It is certified that error appears in the above-identified patent and that said Letters Patent is hereby corrected as shown below:

Column 5, line 54, "line" should read --live--.
Column 5, line 61, "line" should read --live--.
Column 9, line 48, "24" should read --20--.

Signed and Sealed this

Nineteenth Day of March 1985

[SEAL]

Attest:

DONALD J. QUIGG

Attesting Officer     Acting Commissioner of Patents and Trademarks